United States Patent Office 3,069,322
Patented Dec. 18, 1962

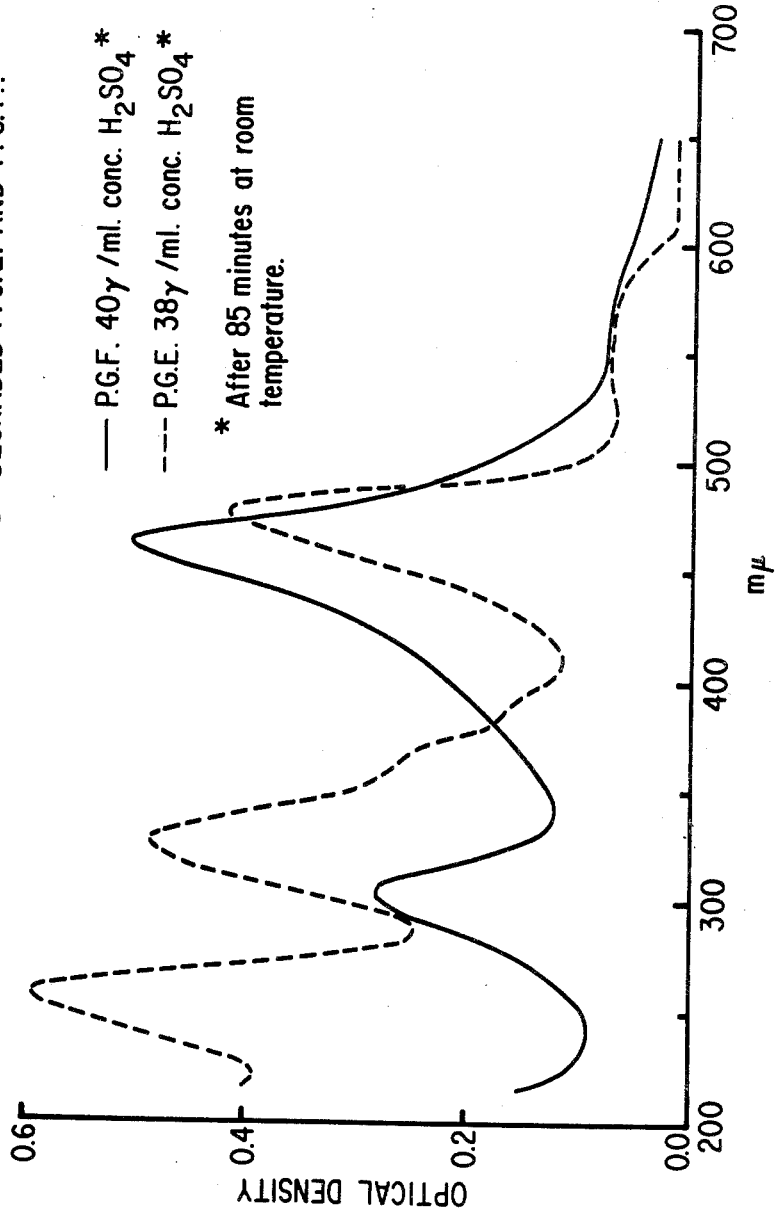

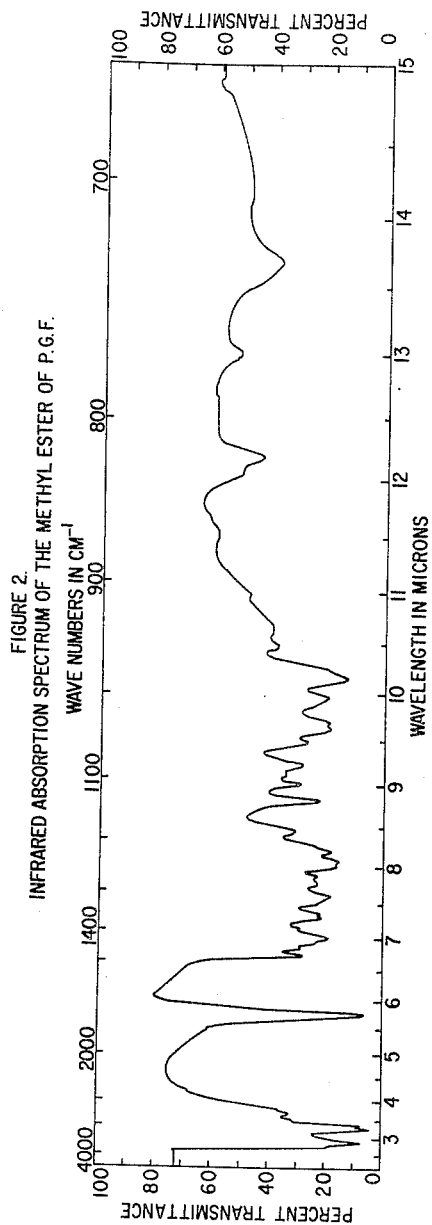

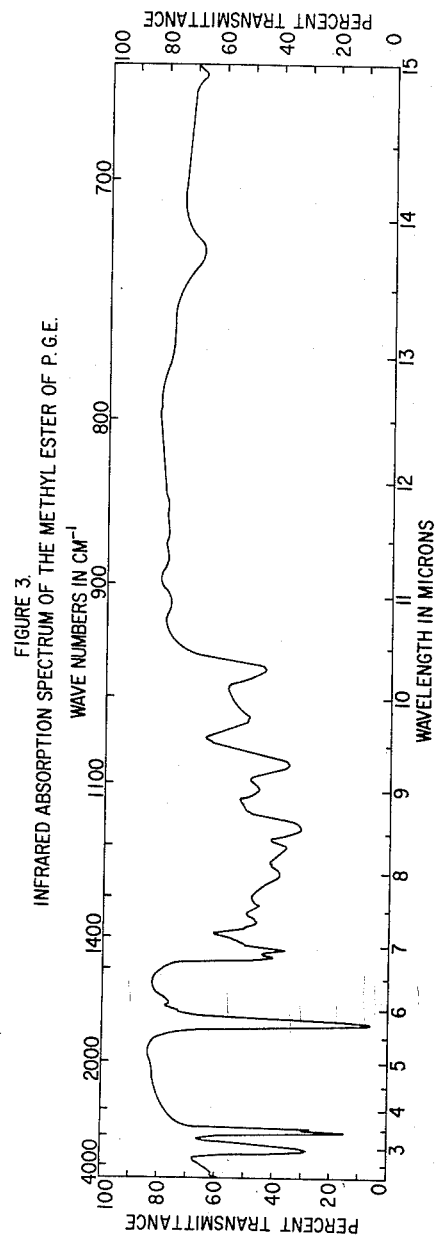

3,069,322
PGE AND PGF
Sune Bergström and Jan Sjövall, both % University
of Lund, Lund, Sweden
Filed May 28, 1958, Ser. No. 738,514
10 Claims. (Cl. 167—74)

This invention relates to a composition of matter and for a process for the production thereof. More particularly this invention is concerned with new crystalline materials herein designated as PGE and PGF, their esters and salts, and to the preparation thereof.

These new and useful compounds, PGE and PGF have pharmacodynamic activity. PGE is active both in stimulating smooth muscle tissue and in lowering blood pressure. PGF is active also in stimulating smooth muscle tissue but has no effect on blood pressure.

Crude products obtained from accessory genital glands, sperm, and the like have heretofore been noted to have pharmacodynamic effects such as hyper- or hypotensive activity, and smooth muscle-stimulating activity. Thus hypertensive activity was noted by Japelli and Scopa in 1906 (Arch. Ital. Biol. 45, 165), in an extract of dog prostate glands, hypotensive activity and smooth muscle-stimulating activity were noted by Kurzrok in 1931 (Proc. Soc. Exp. Biol., N.Y., 28, 268), Goldblatt in 1933 (Chem. E. Ind. 52, 1056), and Von Euler in 1931–6 (Arch. Exp. Path. Pharmak. 175, 78 (1934), 181, (1936), J. Physiol. 72, 74 (1931), 81, 102 (1934), 84, 21 (1935), 88, 213 (1936), Klin. Wschr. 14, 1182 (1935)). A crude material, designated prostaglandin, having hypotensive activity and smooth muscle-stimulating activity was reported by Von Euler.

None of the prior art products, however, were dissociated from the mammalian glandular tissue or products and none had smooth muscle-stimulating activity free of hypotensive activity.

In accordance with this invention two distinct compounds, herein designated PGE and PGF, have now been isolated in essentially pure crystalline form from crude materials, such as Von Euler named prostaglandin, or directly from accessory genital materials such as prostate glands and sperm. Both compound PGE and compound PGF have smooth muscle-stimulating activity but only compound PGE has hypotensive activity. The use of pure crystalline PGE and PGF removes the possibility of having undesirable side-effects as are normally to be expected when using a natural product as powdered, dry, glandular tissue and makes the materials available in the concentrations effective for the practical accomplishment of their respective pharmacodynamic effects.

One method of producing pure PGE and PGF is by extracting it from prostate glands of mature sheep and upgrading the extract by a series of solvent transfers, first into an alkaline aqueous solution as a soluble salt form and then back into an organic solvent as the free acid form, or vice versa, followed by countercurrent distribution and reverse phase partition chromatography. In this manner it is possible to separate PGE and PGF and to obtain them both in essentially pure crystalline form.

Both PGE and PGF are unsaturated, non-aromatic hydroxycarboxylic acids containing only the elements carbon, hydrogen, and oxygen in the proportions of about 4:7:1. Both crystallize as needle-shaped, colorless crystals. Both form esters and salts typical of carboxylic acids. Both are inactivated on heating to 100 degrees centigrade in 0.43 normal hydrochloric acid in fifty percent ethanol for thirty minutes. Both take up one mole of hydrogen on hydrogenation. Both give characteristic, though differernt, ultraviolet spectra after treatment with concentrated sulfuric acid for 85 minutes at room temperature. Both give characteristic, though different, infrared spectra. Both form crystals having characteristic, though different, X-ray diffraction patterns. Both give characteristic, though different, mass spectrographs. Both appear to have a molecular weight in the order of about $350 \pm 10$. PGE is believed to have a molecular formula of $C_{20}H_{34-36}O_5$ and PGF is believed to have essentially the same molecular formula. Both have essentially the same elemental analysis for carbon, hydrogen, and oxygen, and being hydroxy-carboxylic acids, can be represented by the formula

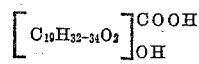

Both have about the same activity in stimulating smooth muscle tissue. PGE lowers the blood pressure, i.e., has hypotensive activity, whereas PGF does not.

Esters of PGE and PGF, such as the methyl, ethyl, 2-ethylhexyl, cyclohexyl, benzyl, benphydryl and like lower hydrocarbyl esters, are formed by the usual methods for example, by reaction with diazomethane or other appropriate diazohydrocarbons. These esters have the same kind of activity as the free acids. The methyl ester of PGF is more active in stimulating smooth muscle tissue than PGF whereas the methyl ester of PGE is about as active as PGE. PGE and PGF can also be hydrogenated by the usual methods for saturating ethenoid double bonds, for example hydrogenation in a solvent such as ethanol, acetic acid, or a mixture of the two, in the presence of Raney nickel, platinum, or like hydrogenation catalyst, to give products, dihydro PGE and dihydro PGF, which are also active physiologically.

In the presence of a base, salts are formed. Thus the acids of the invention form salts with the alkali metal and alkaline earth metal bases such as sodium, potassium, lithium, ammonium, calcium, barium, strontium, and magnesium hydroxides and carbonates, and basic amines such as mono-, di-, and trimethylamines, mono-, di-, and triethylamines, mono-, di-, and tripropylamines (iso and normal), ethyldimethylamine, benzyldiethylamine, cyclohexylamine, benzylamine, dibenzylamine, N,N-dibenzyl-ethylene diamine, bisortho-methoxy-N-methyl ortho-phenylisopropylamine, methoxyphenylisopropylamine, and the like lower-aliphatic, lower-cycloaliphatic, and lower-aralipahtic amines up to and including about eight carbon atoms; heterocyclic amines such as piperidine, morpholine, pyrrolidine, piperazine, and the lower-alkyl derivatives thereof, such as, 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine; as well as amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris (hydroxymethyl) aminomethane, phenylmonoethanolamine, p-tertiaryamylphenyldiethanol amine, and galactamine, N-methyl glucamine, N-methyl glucosamine, ephedrine, phenylephrine, epinephrine, procaine.

In the drawings:

FIGURE 1 shows the ultraviolet absorption spectra of crystalline PGF (40 micrograms, solid line) and of crystalline PGE (38 micrograms, broken line) after 85 minutes at room temperature in one milliliter of concentrated sulfuric acid. The PGF spectrum has peaks at about 308 and 465 millimicrons whereas the PGE spectrum has peaks at about 250, 328, and 477 millimicrons.

FIGURE 2 shows the infrared absorption spectrum of the methyl ester of PGF.

FIGURE 3 shows the infrared absorption spectrum of the methyl ester of PGE.

All percentages are as volume per volume unless otherwise noted.

The new compounds can be used as medicaments, for example, in the form of pharmaceutical preparations, which contain the compound or a salt thereof in admixture with a pharmaceutical organic or inorganic carrier suitable for enteral, parenteral or topical administration. For making such carriers there are used substances which do not react with the new compounds, for example, water, gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example, in the form of tablets, capsules, pills, suppositories, bougies, or in liquid form as solutions, suspensions, or emulsions. If desired they may be sterilized and/or may contain auxiliary substances, such as preserving agents, stabilizing agents, wetting or emulsifying agents, salts for regulating the osmotic pressure or buffers. They may also contain other therapeutically valuable substances, for example, anti-bacterials.

The following examples are illustrative of the process and products of the present invention, but are not to be construed as limiting.

*Example 1*

Freeze-dried sheep prostate glands were minced in a meat-grinder. The dry glands were suspended in distilled water, using four liters per kilogram of dried glands. After fifteen minutes, twelve liters of 95 percent ethanol were added. The minced glands were stirred mechanically for about one hour, and then left to sediment over night. The supernatant, clear ethanol solution, was decanted, and the insoluble residue was strained through cheesecloth and filtered. The supernatant and filtrate were combined and evaporated in vacuo to about ½₀ the original volume, i.e., to about three liters. This crude extract was itself extracted with about three liters of ether. The water-phase was then acidified to pH 3.5 and extracted again with three liters of ether and then twice with 1.5 liters of ether. The combined ether extracts were extracted six times with ¼ volume or about 2.25 liters of 0.2 molar phosphate buffer of pH 8. During the first extraction, the pH of the buffer had to be adjusted back to pH 8 with two normal sodium carbonate. The combined buffer phases were acidified to pH 3 with 6 normal hydrochloric acid and extracted with 1 volume, i.e., about 13.5 liters of ether, then extracted three additional times each with seven liters of ether. The ether extracts were combined and washed until free of chloride ions with small portions of water, each water portion being passed through a second ether phase. The ether was evaporated in vacuo, leaving a solid residue. The residue was subjected to a five stage countercurrent distribution between equal volumes of ether and 0.5 molar phosphate buffer at pH 6.4, 200 milliliters being used per five grams of extract. The buffer phases were acidified and extracted three times with ether. All phases were evaporated to dryness, weighed, and the physiological activity of each was determined.

| Phase number | Sample number | Weight (g.) | Physiological activity, relative units | |
|---|---|---|---|---|
| | | | Per phase | Per mg. |
| Ether: | | | | |
| 1 | a | 6.40 | 7,200 | 1 |
| 2 | b | 0.80 | 2,200 | 3 |
| 3 | c | 0.25 | 1,300 | 5 |
| 4 | d | 0.15 | 1,000 | 7 |
| 5 | e | 0.10 | 1,200 | 12 |
| Buffer: | | | | |
| 5 | f | 0.06 | 1,700 | 28 |
| 4 | g | 0.05 | 1,900 | 38 |
| 3 | h | 0.05 | 2,400 | 48 |
| 2 | i | 0.08 | 2,200 | 37 |
| 1 | j | 0.80 | 2,100 | 3 |

The physiological activity was determined on duodenal intestinal strips of rabbits in a bath of 30 milliliters according to the procedure of Von Euler [Archiv. für Physiologie, 77: 96–99 (1937)].

Samples "d" through "i" which contained the bulk of the PGF were pooled and further treated to remove impurities. Samples "a" through "c" which contained the bulk of the PGE were likewise pooled and treated to remove impurities. Each pool (the PGE pool and the PGF pool) was dissolved in the mobile phase of an isooctanol:chloroform:methanol:water (1:1:10:10) system at the rate of 100 milligrams per three to five milliliters of mobile phase. The column in which four milliliters of static phase (upper phase) of an isooctanol:chloroform:methanol:water (1:1:10:10) system was supported on 4.5 grams of hydrofobic diatomite (kieselguhr treated with chloromethylsilane) was charged with 100 milligrams of the pooled sample mixed with a minimum of about three to five milliliters of mobile phase, and then developed with mobile phase. The first fifty milliliters of eluates were physiologically inactive, the next 65 milliliters (about 50 to 115 milliliters) showed activity with a peak at about the sixtieth milliliter of the effluent of about 2000 Von Euler units. The remainder of the effluent was inactive. An approximately five fold purification of the active compounds was obtained from this step.

The PGF and PGE concentrate, the fifty to 115 milliliter fraction, was further purified and separated by reverse phase chromatography as described above using a methanol:water:isoamyl acetate:chloroform (35:65:4:6) solvent system.

The PGF was found in the 25 to 45 milliliter fraction and the PGE in 100 to 130 milliliter fraction. The peaks of the PGF and PGE fraction measured about 2000 Von Euler units.

The peak fractions were relatively pure since partition (not reverse phase) chromatography of them using an ethylene-chloride:heptane:acetic acid:water (15:15:6:4) solvent system yielded fractions having ideal curves, i.e. curves typical of essential pure compounds, that gave crystals of PGE and PGF on standing at four degrees centigrade. These crystals were characterized as follows.

PGF

Crystal habitat: colorless needle-shaped.
Melting point: 102–3 degrees centigrade.
Ultraviolet absorption spectrum: acid degraded material (forty milligrams in one milliliter of concentrated sulfuric acid after 85 minutes at room temperature) shows peaks at about 308 and 465 millimicrons.
Infrared absorption spectrum: the methyl ester of PGF exhibits characteristic absorption at the following wave lengths expressed in reciprocal centimeters;

| | | | | |
|---|---|---|---|---|
| 3279 | 1340 | 1205 | 1030 | 942 |
| 2611 | 1299 | 1172 | 1022 | 825 |
| 1700 | 1272 | 1124 | 995 | 816 |
| 1460 | 1253 | 1099 | 977 | 765 |
| 1406 | 1235 | 1074 | 945 | 726 |
| 1351 | 1223 | 1046 | 932 | |

*Elemental analysis.*—Calculated for $C_{20}H_{34-36}O_5$: C, 67.4–67.8; H, 9.7–10.2; O, 22.4–22.6. Found: C, 67.2; H, 10.0; O, 22.6.

Interplanar spacings in Angstrom units obtained by X-ray diffraction of crystalline PGF are as follows:

| d, A. | I |
|---|---|
| 16.44 | Sharp. |
| 9.46 | Weak. |
| 8.16 | Do. |
| 6.19 | Medium. |
| 5.46 | Do. |
| 5.05 | Do. |
| 4.71 | Very weak. |
| 4.63 | Very sharp. |
| 4.54 | Medium. |
| 4.46 | Do. |

| d, A. | I |
|---|---|
| 4.08 | Medium. |
| 4.02 | Sharp. |
| 3.74 | Weak. |
| 3.56 | Do. |
| 3.45 | Do. |
| 3.07 | Very weak. |
| 2.93 | Do. |
| 2.80 | Weak. |
| 2.67 | Do. |
| 2.56 | Very weak |
| 2.48 | Do. |
| 2.39 | Do. |
| 2.34 | Do. |
| 2.02 | Do. |
| 1.48 | Weak. |
| | Do. |

PGE

Crystal habitat: Acicular orthorhombic ($P2_12_12_1$) colorless crystal.

Unit cell dimensions are:
A equals $8.23 \pm 0.04$ A.
B equals $19.4 \pm 0.1$ A.
C equals $25.9 \pm 0.1$ A.

Containing eight molecules per unit cell, and having a molecular weight of $353 \pm 5$.

Exhibits a specific gravity by flotation in potassium bromide solution of about 1.135 grams per cubic centimeter.

Melting point 115-7 degrees centigrade.

Ultraviolet absorption spectrum: Acid degraded material (38 milligrams of crystalline PGE in one milliliter of concentrated sulfuric acid, after 85 minutes at room temperature) shows peaks at about 250, 328, and 477 millimicrons.

Infrared absorption spectrum: The methyl ester of PGE exhibits characteristic absorption at the following wave lengths expressed in reciprocal centimeters:

| | | | |
|---|---|---|---|
| 3333 | 1364 | 1109 | 667 |
| 1736 | 1351 | 1073 | |
| 1634 | 1319 | 1020 | |
| 1460 | 1250 | 971 | |
| 1437 | 1197 | 912 | |
| 1374 | 1166 | 726 | |

*Elemental analysis.*—Calculated for $C_{20}H_{34-36}O_5$: C, 67.4-67.8; H, 9.7-10.2; O, 22.4-22.6. Found: C, 66.5-67.0; H, 10.6-10.3; O, 22.9.

Interplanar spacings in Angstrom units obtained by X-ray diffraction of crystalline PGE are as follows:

| d, A. | I |
|---|---|
| 13.00 | Sharp. |
| 6.45 | Very weak. |
| 6.13 | Do. |
| 5.80 | Weak. |
| 5.75 | Medium. |
| 5.01 | Do. |
| 4.26 | Very weak. |
| 4.20 | Do. |
| 4.14 | Very sharp. |
| 3.97 | Sharp. |
| 3.91 | Medium. |
| 3.75 | Very weak. |
| 3.48 | Weak. |
| 3.25 | Do. |
| 3.18 | Do. |
| 3.06 | Do. |
| 2.87 | Very weak. |
| 2.75 | Weak. |
| 2.65 | Very weak. |
| 2.59 | Do. |
| 2.50 | Weak. |
| 2.44 | Very weak. |
| 2.39 | Do. |
| 2.38 | Do. |
| 2.35 | Do. |

The crystalline PGE is active at a concentration of $10 \times 10^{-9}$ grams per milliliter in causing a marked contraction of a duodenal strip. The crystalline PGF is active at a concentration of about $5 \times 10^{-9}$ grams per milliliter. The crystalline PGE, on injection of two to four micrograms into a 2.5 kilogram rabbit, lowers the blood pressure about ten to twenty millimeters.

Example 2

PGF and PGE can also be separated and isolated by using a solvent system consisting of ethylene chloride: heptane:acetic acid:water (5:5:7:3) equilibrated at 23 degrees centigrade. Aliquots of fractions of countercurrent distribution as from Example 1 were applied to the starting point of a strip of Whatman filter paper. The paper was allowed to hang for sixteen hours in a tank in the vapors of both phases before being brought into contact with the mobile phase. The chromatogram was then run for seven hours using the ascending technique. A separation of PGF and PGE was thus obtained, the PGF moving slower than the PGE. The spots were revealed by spraying with a fifteen percent ethanolic solution of phosphomolybdic acid and heating at eighty degrees centigrade for a few minutes. The PGE and PGF were eluted from the portion of the paper containing them by ethyl acetate and crystallized therefrom.

Example 3

To a dry ether solution of one milligram (2.8 micromoles) of crystalline PGE was added a slight excess of diazomethane, prepared in ether from four micromoles of nitrosomethylurethane. The reaction mixture was allowed to stand for about five minutes, and the ether and excess diazomethane distilled off. On distillation to dryness there was obtained crystalline methyl ester of PGE having the characteristic infrared absorption spectrum shown in FIGURE 3.

Example 4

Folowing the procedure of Example 3, substituting crystalline PGF for the crystalline PGE, there was obtained crystalline methyl ester of PGF having the characteristic infrared absorption spectrum shown in FIGURE 2.

The infrared spectra referred to above were obtained by the KBr disk method.

In place of diazomethane in Examples 3 and 4 other diazoalkanes such as diazoethane, 1-diazo-2-ethylhexane, cyclohexyldiazomethane, phenyldiazomethane, diphenyldiazomethane, and the like can be used to form the ethyl ester of PGE, the 2-ethylhexyl ester of PGE, the cyclohexylmethyl ester of PGE, the benzyl ester of PGE, the benzhydryl ester of PGE, the ethyl ester of PGF, the 2-ethylhexyl ester of PGF, the cyclohexylmethyl ester of PGF, the benzyl ester of PGF, the benzhydryl ester of PGF, and the like. Other methods can also be used for preparing the same esters. For example, the silver salts of PGE and PGF can be reacted with the appropriate iodide, for example, methyl, ethyl, 2-ethylhexyl, benzyl, or benzhydryl iodide.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of PGE and the lower hydrocarbyl esters and salts thereof, said compound being essentially pure and free of PGF or the corresponding ester or salt thereof, said PGF being a compound associated with PGE in prostaglandin and being characterized as set forth in claim 6, and said PGE having the following formula:

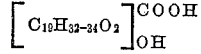

and being characterized by being an unsaturated, nonaromatic hydroxycarboxylic acid and having the following properties.

Molecular formula: $C_{20}H_{34-36}O_5$
Molecular weight: $353 \pm 5$
Elemental analysis: C, 66.5-67.0; H, 10.6-10.3; O, 22.9
Melting point: 115-117° C.

Crystal habit:: colorless, acicular orthorhombic
Ultraviolet absorption of acid degraded material: peaks at 250 mµ, 328 mµ, and 477 mµ
Infrared absorption of methyl ester (wave lengths expressed in reciprocal centimeters):

| | | |
|---|---|---|
| 3333 | 1351 | 1020 |
| 1736 | 1319 | 971 |
| 1364 | 1250 | 912 |
| 1460 | 1197 | 726 |
| 1437 | 1166 | 667 |
| 1374 | 1109 | |
| 1364 | 1073 | |

2. Essentially pure crystalline PGE as characterized in claim 1.

3. Essentially pure lower hydrocarbyl ester of PGE as characterized in claim 1.

4. Essentially pure methyl ester of PGE as characterized in claim 1.

5. Essentially pure ethyl ester of PGE as characterized in claim 1.

6. A compound essentially free of hypotensive activity selected from the group consisting of PGF and the lower hydrocarbyl esters and salts thereof, said compound being essentially pure and free of PGE or the corresponding ester or salt thereof, said PGE being a compound associated with PGF in prostaglandin and being characterized as set forth in claim 1, and said PGF having the following formula:

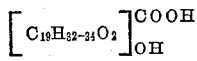

and being characterized by being an unsaturated, non-aromatic hydrocarboxylic acid and by having the following properties.

Molecular formula: $C_{20}H_{34-36}O_5$
Molecular weight: $350 \pm 10$
Elemental analysis: C, 67.2; H, 10.0; O, 22.6
Melting point: 102–103° C.
Crystal habit: colorless, needle-shaped
Ultraviolet absorption of acid degraded material: peaks at 308 mµ and 465 mµ
Infrared absorption of the methyl ester (wave lengths expressed in reciprocal centimeters):

| | | |
|---|---|---|
| 3279 | 1235 | 995 |
| 2611 | 1223 | 977 |
| 1700 | 1205 | 945 |
| 1460 | 1172 | 932 |
| 1406 | 1124 | 942 |
| 1351 | 1099 | 825 |
| 1340 | 1074 | 816 |
| 1299 | 1046 | 765 |
| 1272 | 1030 | 726 |
| 1253 | 1022 | |

7. Essentially pure crystalline PGF as characterized in claim 6.

8. Essentially pure lower hydrocarbyl ester of PGF as characterized in claim 6.

9. Essentially pure methyl ester of PGF as characterized in claim 6.

10. Essentially pure ethyl ester of PGF as characterized in claim 6.

References Cited in the file of this patent

Euler: Chem. Abst., vol. 32, 1938, page 6404.
Bergstrom: Nordisic Medicin, vol. 42, pages 1465–1466.